May 2, 1939.    G. SMITH    2,157,024
GAUGE LINE WIPER
Filed May 28, 1937

Inventor
Glen Smith
By
Edward V. Hardway
Attorney

Patented May 2, 1939

2,157,024

UNITED STATES PATENT OFFICE 2,157,024

GAUGE LINE WIPER

Glen Smith, Clarkwood, Tex.

Application May 28, 1937, Serial No. 145,225

2 Claims. (Cl. 15—210)

This invention relates to a line wiper and has more particular relation to a wiper specially designed for wiping and cleansing a gauge line used in gauging the depth of liquids such as oil in tanks.

Another object of the invention is to provide in combination with a gauge line wiper, a hanger for the plumb-bob or weight carried by the end of the line.

With the above and other objects in view, the invention has particular relation to certain novel features of construction, operation and arrangement of parts an example of which is given in this specification and illustrated in the accompanying drawing, wherein.

Figures 1, 2, 3, 4:
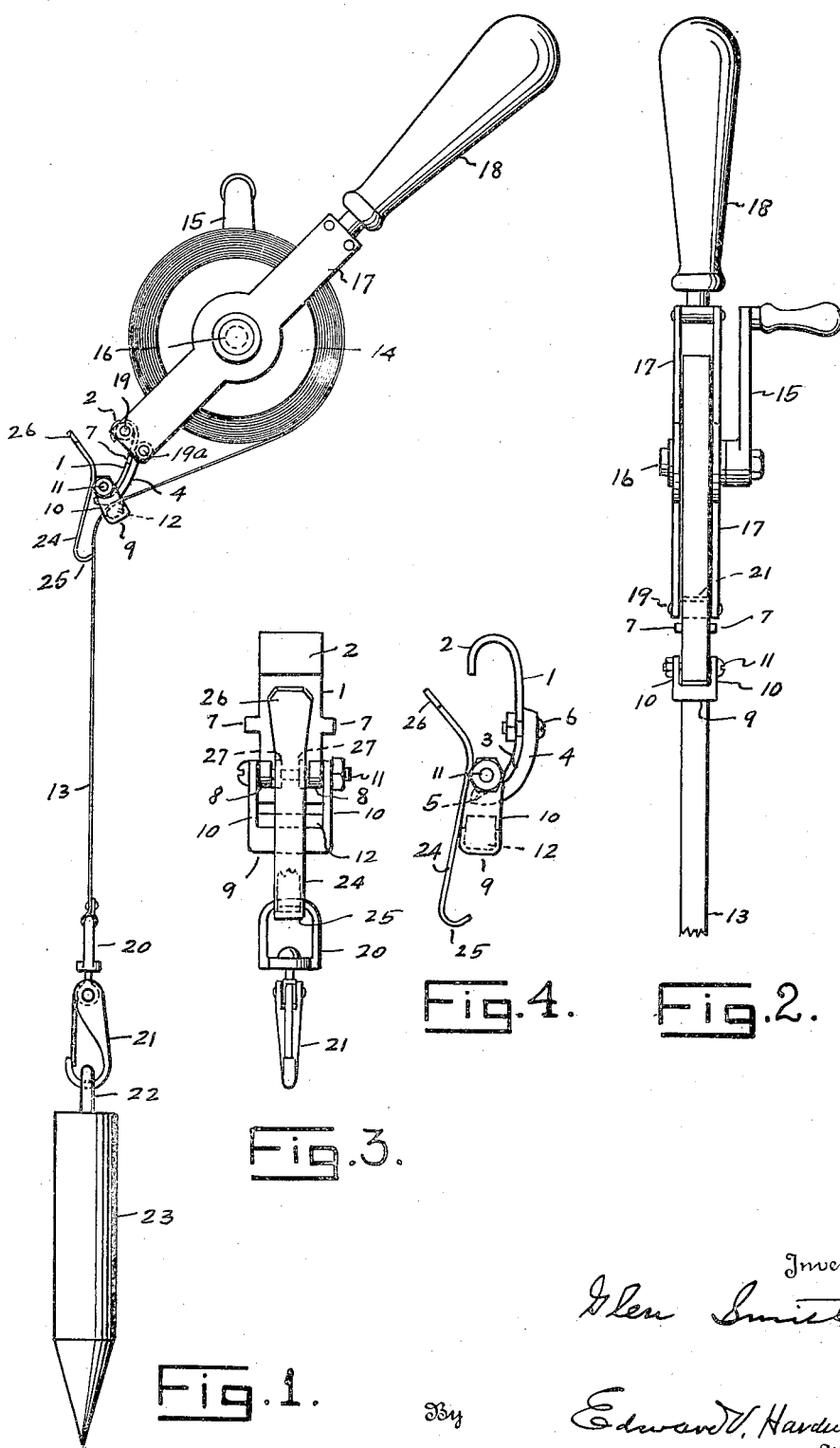
Figure 1 shows a side view of the reel and line, showing the wiper carried by the reel frame.
Figure 2 shows an elevational view.
Figure 3 shows an elevational view of the wiper and hanger.
Figure 4 shows a side view.

Referring now more particularly to the drawing wherein like numerals of reference designate similar parts in each of the figures, the numeral 1 designates a bracket, the upper end of which is provided with a hook and whose lower end is provided with the curved surface 3.

Secured on the outer side of the curved portion there is a wiper pad 4. This pad is preferably formed of leather or other suitable wiping material. One end of the pad is engaged over the tang 5 at the lower end of the bracket and the pad is drawn closely around the curved surface 3 and is secured, at its other end, to the bracket, by the bolt 6. The bracket has the laterally extended stops 7, 7 for a purpose to be hereinafter described.

The lower end of the bracket has the upstanding ears 8, 8 preferably formed integrally therewith. There is a U-shaped guide 9 having the side arms 10, 10, whose free ends embrace the ears 8, as shown in Figure 3, and a bolt 11 passes through suitable aligned bearings in the side arms 10, and ears 8, whereby the guide is pivotally mounted. This guide has a wiper pad 12 mounted therein which cooperates with the pad 4.

There is a measuring line 13, preferably formed of steel, and which is flexible. This line may be wound on to the reel 14 which may be turned by the crank 15. This crank is fixed on a crank shaft 16 which has bearings in the side members 17, 17 of the reel frame. This frame has a grip member 18 attached to one end thereof by means of which it may be handled. The other ends of the side members are secured together by the transverse pins 19, 19a. These last mentioned ends are suitably spaced apart by a space block 21.

The hook 2 is engaged over the pin 19 as shown in Figure 1 and the range of its movement is limited by the engagement of the stops 7 with the corresponding ends of the side members 17. The gauge line 13 works between the side arms 10 of the guide 9 as shown in Figures 1 and 2. The lower end of the line 13 is attached to a clevis 20 and a snap hook 21 has a swivelling connection with said clevis and is engaged through the bail of the plumb-bob 23.

There is a hanger 24 whose lower end is formed with a hook 25 and whose upper end is retracted and formed into a pressure plate 26. This hanger has the overturned parallel ears 27, 27 having bearings to receive the cross bolt 11 whereby the hanger is pivotally mounted.

While the apparatus is being carried from place to place the swivel 20 may be engaged over the hanger hook 25, as shown in Figure 3, so as to support the weight of the plumb-bob and to relieve the line of such weight so that the line will not be so liable to become broken. When it is desired to gauge a tank, the pressure plate 26 may be depressed to disengage the hook 25 from the clevis and the weight of the plumb-bob will cause the line 13 to unwind, permitting the line to descend in to the liquid to be measured. When the measurement is taken the line is reeled up on the reel 14. As it moves upwardly the friction of the line against the pad 12 will cause the guide to swing upwardly to the position shown in Figure 2 so as to carry the line upwardly also swinging the guide 9 upwardly and carrying the pad 12 into cooperative relation with the pad 4. This is true because the bolt 11 is eccentric with respect to the curvature of the outer face of the pad 4. As the line moves upwardly it will pass closely between the pads 12 and 4, and the oil, or other liquid, will thus be wiped off of the line so the line will be comparatively clean and free of oil as it is wound on the reel.

When the clevis 20 reaches the hanger hook 15 said hook may be engaged through said clevis to support the plumbbob, for the purpose herein stated.

The drawing and description disclose what is now considered to be a preferred form of the invention by way of illustration only, while the broad principle of the invention will be defined by the appended claims.

What I claim is:

1. A line wiper comprising a bracket one end of which is formed into a hook, the other end of said bracket being provided with a curved surface, a wiper pad on said curved surface, a U-shaped line guide having its arms pivotally mounted eccentric to the axis of said curved surface on said other end of said bracket, a wiper pad mounted in the guide and movable with the guide under the influence of the friction of the line, as it moves in one direction, to carry the line into cooperating relation with the pad on the bracket.

2. A line wiper comprising a bracket one end of which is formed into engaging means and whose other end is formed with a curved surface, a wiper pad on the curved surface, a U-shaped line guide having its arms pivotally mounted on the other end of the bracket so that the guide will swing on an arc eccentric to the curvature of said surface, a wiper pad mounted in said guide, said guide, and the pad carried thereby, being movable under the influence of the friction of the line with the said last mentioned pad, as the line moves in one direction, to carry the line into cooperating relation with the other pad, movement of the line in the other direction moving said guide to terminate in said cooperating relation.

GLEN SMITH.